United States Patent [19]
Buchler et al.

[11] Patent Number: 5,757,317
[45] Date of Patent: May 26, 1998

[54] RELATIVE NAVIGATION UTILIZING INERTIAL MEASUREMENT UNITS AND A PLURALITY OF SATELLITE TRANSMITTERS

[75] Inventors: Robert J. Buchler, Calabasas Park; Kai-Nan Chueh, Thousand Oaks, both of Calif.

[73] Assignee: Litton Systems, Inc., Woodland Hills, Calif.

[21] Appl. No.: 819,423

[22] Filed: Mar. 17, 1997

[51] Int. Cl.$^6$ .............................. H04B 7/185; G01S 5/02
[52] U.S. Cl. ........................ 342/357; 342/455; 701/214
[58] Field of Search ............................. 342/357, 455; 701/214

[56] References Cited

U.S. PATENT DOCUMENTS 5,587,904   12/1996   Ben-Yair et al. .................... 364/449.7
5,596,332   1/1997    Coles et al. ............................ 342/455

Primary Examiner—Theodore M. Blum
Attorney, Agent, or Firm—Robert E. Malm

[57] ABSTRACT

The invention is a method for determining the relative position and velocity of a second vehicle with respect to a first vehicle. The method is practiced on board the second vehicle and utilizes a plurality of satellite transmitters and an inertial measurement unit on the second vehicle. The first vehicle has available a plurality of data items consisting of the first vehicle's measured position, measured velocity, and specific-force acceleration. The second vehicle has available data items consisting of the second vehicle's measured position, measured velocity, specific-force acceleration, autonomous position, autonomous velocity, autonomous position correction, and autonomous velocity correction. The measured position and measured velocity are determined utilizing the radio signals from a plurality of satellite transmitters and the specific-force acceleration is obtained from an inertial measurement unit. The autonomous position, autonomous velocity, autonomous position correction, and autonomous velocity correction are outputs of an autonomous Kalman filter process, the inputs being derived from the second vehicle's measured position, measured velocity, and specific-force acceleration. The method comprises the steps of (a) obtaining a plurality of the first vehicle's data items from the first vehicle and (b) determining the estimated relative position and the estimated relative velocity of the second vehicle with respect to the first vehicle utilizing the plurality of data items obtained from the first vehicle and one or more of the second vehicle's data items including either the specific-force acceleration or the group of data items consisting of autonomous position, autonomous velocity, autonomous position correction, and autonomous velocity correction.

15 Claims, 2 Drawing Sheets

RELATIVE NAVIGATION UTILIZING INERTIAL MEASUREMENT UNITS AND A PLURALITY OF SATELLITE TRANSMITTERS

BACKGROUND OF INVENTION

This invention relates generally to satellite-inertial navigation systems and more particularly to methods and apparatus for navigating one vehicle with respect to another in a satellite-inertial navigation environment. The use of "satellite" is meant to include not only earth-circling satellites of all varieties but also other forms of platforms that can be cooperatively used in establishing the position and velocity of a platform that carries an inertial navigation system.

The Global Positioning System (GPS), the current exemplar of an earth-orbiting satellite navigation system, consists of 24 globally-dispersed satellites with synchronized atomic clocks. Each satellite transmits a coded signal having the satellite clock time embedded in the signal and carrying information concerning the ephemerides of the satellites and its own daily ephemeris and clock corrections. A user obtains the essential data for determining his position and clock error by measuring the differences in his receiver clock time and the satellite clock times embedded in the signals from at least four viewable satellites. The difference in receiver clock time and satellite clock time multiplied by the radio wave propagation velocity is called the pseudorange and is equal to the range to the satellite plus the incremental range equivalent of satellite clock error minus the receiver clock error.

The user also obtains the essential data for determining his velocity by measuring for each satellite the difference in the frequency of the actual satellite signal and the frequency of the satellite signal if it had been generated using the receiver clock. The accumulated change in phase over a fixed period of time resulting from this frequency difference expressed in units of distance is called the delta range and is equal to the change in satellite range over the fixed period of time plus the change in the difference in the receiver and satellite clocks over the same fixed period of time multiplied by the radio wave propagation velocity.

The user, knowing the positions, velocities, and clock errors of the satellites, can compute his own position, velocity, and clock error from the measured pseudoranges and delta ranges.

Since the more significant errors in GPS-determined positions of nearby platforms are highly correlated, these errors tend to cancel out in determining the relative positions of the platforms. The use of GPS for making highly-accurate relative position determinations of nearby platforms is referred to as differential GPS.

SUMMARY OF THE INVENTION

The invention is a method for determining the relative position and velocity of a second vehicle with respect to a first vehicle. The method is practiced on board the second vehicle and utilizes a plurality of satellite transmitters and an inertial measurement unit on the second vehicle. The first vehicle has available a plurality of data items consisting of the first vehicle's measured position, measured velocity, and specific-force acceleration. The measured position and measured velocity are determined utilizing the radio signals from a plurality of satellite transmitters, and the specific-force acceleration is obtained from an inertial measurement unit. The measured position and measured velocity are expressed as ranges and range rates with respect to the plurality of satellite transmitters or as coordinates in some other predetermined coordinate system.

The second vehicle has available data items consisting of the second vehicle's measured position, measured velocity, specific-force acceleration, autonomous position, autonomous velocity, autonomous position correction, and autonomous velocity correction. The measured position and measured velocity are determined utilizing the radio signals from a plurality of satellite transmitters and the specific-force acceleration is obtained from an inertial measurement unit. The measured position and measured velocity are expressed as ranges and range rates with respect to the plurality of satellite transmitters or as coordinates in some other predetermined coordinate system. The autonomous position, autonomous velocity, autonomous position correction, and autonomous velocity correction are outputs of an autonomous Kalman filter process, the inputs to the autonomous Kalman process being derived from the second vehicle's measured position, measured velocity, and specific-force acceleration. The method comprises the steps of (a) obtaining a plurality of the first vehicle's data items from the first vehicle and (b) determining the estimated relative position and the estimated relative velocity of the second vehicle with respect to the first vehicle utilizing the plurality of data items obtained from the first vehicle and one or more of the second vehicle's data items including either the specific-force acceleration or the group of data items consisting of autonomous position, autonomous velocity, autonomous position correction, and autonomous velocity correction.

DESCRIPTION OF THE PREFERRED EMBODIMENT

The invention is a relative navigation system which enables one vehicle to be navigated with reference to another vehicle and a plurality of satellite transmitters.

Figure 1:
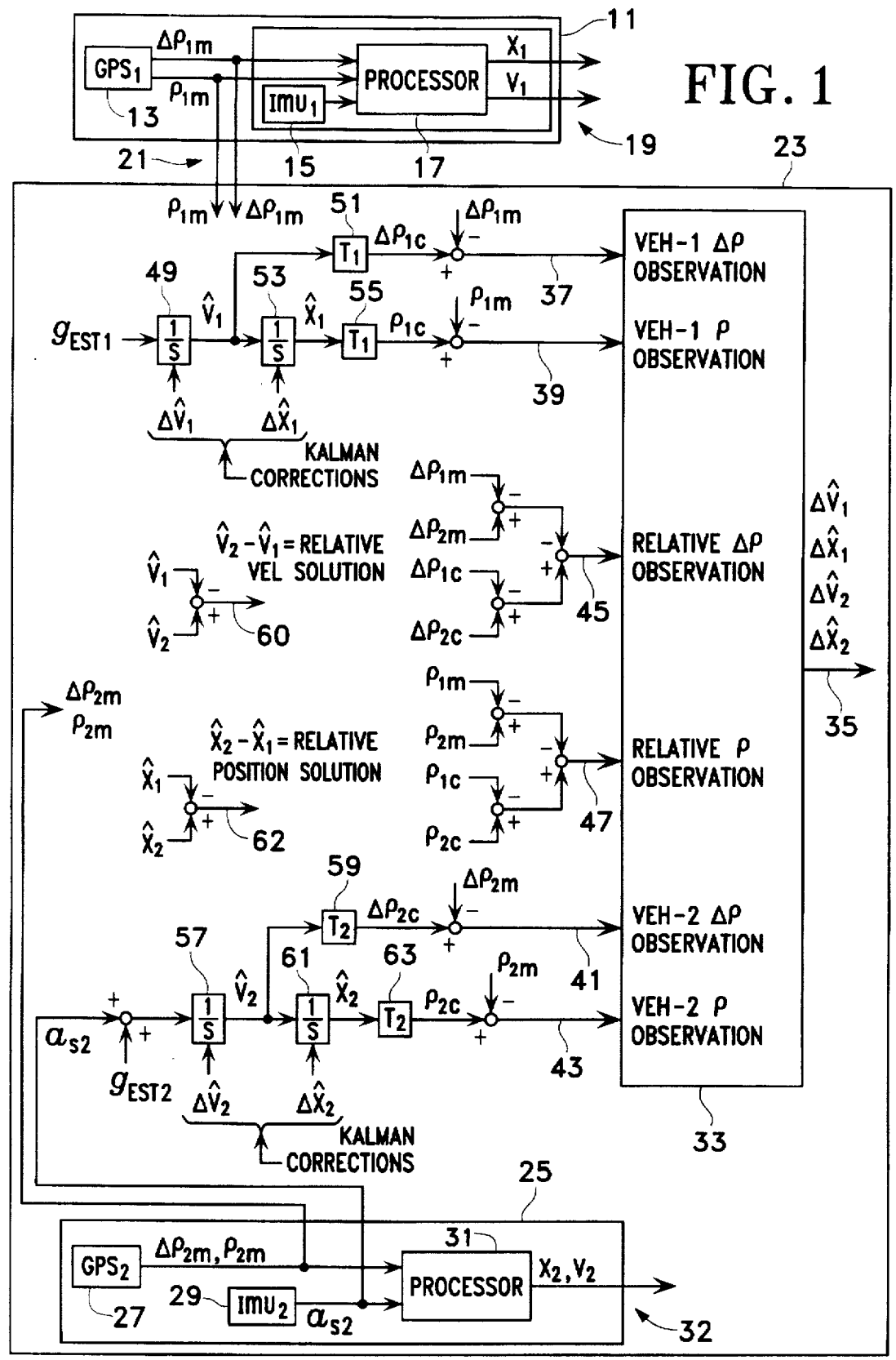
FIG. 1 is a block diagram of a first embodiment of the invention.

A block diagram of a first embodiment of the invention is shown in FIG. 1. The navigation system 11 of a first or reference vehicle includes a GPS receiver 13 and may also include an inertial measurement unit 15 and a processor 17 for performing the navigation calculations and a Kalman filter process. The Kalman filter process is used as a means for obtaining "best estimate" navigation solutions utilizing both GPS and inertial-measurement-unit data. The navigation system 11 of the first vehicle provides at its output 19 its "best estimates" of its position $X_1$ and its velocity $V_1$.

The navigation system 11 of the reference vehicle is linked by communication link 21 to the relative navigation system 23 which is carried by a second vehicle for which relative navigation is desired. The communication link 21 carries the first vehicle's GPS pseudoranges $\rho_{1m}$ and delta ranges $\Delta\rho_{1m}$ to the second vehicle. The symbols $\rho_{1m}$ and $\Delta\rho_{1m}$ are to be interpreted as vector quantities wherein each pseudorange component and each delta range component is associated with one of the satellites being viewed by the first vehicle. Alternatively, the first vehicle's pseudorange vector and delta range vector are transformed into the first vehicle's measured velocity $V_{1m}$ and measured position $X_{1m}$ and transmitted over communication link 21 to the second vehicle.

For some applications, where the first vehicle's navigation system includes an inertial measurement unit, the specific-force acceleration $a_{s1}$ (which corresponds to the actual acceleration minus the acceleration of gravity) as measured by the first vehicle's accelerometers may also be transmitted to the second vehicle over the communication link.

The relative navigation system 23 includes an absolute navigation system 25 consisting of the GPS receiver 27, an inertial measurement unit 29, and a processor 31 for performing the navigation calculations and the Kalman filter process for blending the GPS and inertial measurements to obtain "best estimate" navigation solutions 32. The outputs of the GPS receiver 27 are either the second vehicle's pseudorange vector $\rho_{2m}$ and delta range vector $\Delta\rho_{2m}$ or the transformed versions of these quantities—the second vehicle's measured velocity $V_2$, and measured position $X_{2m}$. The inertial measurement unit 29 provides the second vehicle's specific-force acceleration $a_{s2}$.

The Kalman filter process performed by processor 33 provides the means for obtaining "best estimate" relative navigation solutions. The outputs 35 of the Kalman filter process are the estimated velocity and position corrections $\Delta\hat{V}_1$ and $\Delta\hat{X}_1$ for the first vehicle and the estimated velocity and position corrections $\Delta\hat{V}_2$ and $\Delta\hat{X}_2$ for the second vehicle.

The input observable at input 37 is $(\Delta\rho_{1c}-\Delta\rho_{1m})$ where $\Delta\rho_{1c}$ is the estimated delta range vector of the first vehicle. If the first vehicle is subject only to a gravitational force, then the estimated delta range vector $\Delta\rho_{1c}$ of the first vehicle is obtained by (1) integrating an estimate of gravity $g_{est1}$ at the first vehicle's location over time in integrator 49 and incrementing the integrator output by $\Delta\hat{V}_1$ to obtain the estimated velocity $\hat{V}_1$ and (2) transforming the resulting $\hat{V}_1$ into the estimated delta range vector $\Delta\rho_{1c}$ in transformation processor 51. If the first vehicle is also subject to a specific-force acceleration $a_{s1}$, then $\hat{V}_1$ is obtained by integrating $(a_{s1}+g_{est1})$ over time and incrementing the integrator output by $\Delta\hat{V}_1$.

Integrator 49 is typical of the integrators shown in the drawings. The input at the left of an integrator is a continuous quantity that is integrated continuously over time. The inputs at the top and bottom of an integrator are only available at discrete moments (when, for example, a Kalman update is available) and cause the integrator output to be incremented by the input values at those discrete moments.

The input observable at input 39 is $(\rho_{1c}-\rho_{1m})$ where $\rho_{1c}$ is the estimated pseudorange vector of the first vehicle. The quantity $\rho_{c1}$ is obtained by (1) integrating $\hat{V}_1$ over time in integrator 53 and then incrementing the integrator output by $\Delta\hat{X}_1$ to obtain the estimated position $\hat{X}_1$ and (2) transforming the resulting $\hat{X}_1$ into the estimated pseudorange vector $\rho_{1c}$ in transformation processor 55.

The input observable at input 41 is $(\Delta\rho_{2c}-\Delta\rho_{2m})$ where $\Delta\rho_{2c}$ is the estimated delta range vector of the second vehicle, and $\Delta\rho_{2m}$ is obtained from GPS receiver 27. The estimated delta range vector $\Delta\rho_{2c}$ of the second vehicle is obtained by (1) integrating over time $(a_{s2}+g_{est2})$, the sum of the specific-force acceleration $a_{s2}$ of the second vehicle and an estimate of gravity $g_{est2}$ at the second vehicle's location, in integrator 57 and incrementing the integrator output by $\Delta\hat{V}_2$ to obtain the estimated velocity $\hat{V}_2$ and (2) transforming the resulting $\hat{V}_2$ into the estimated delta range vector $\Delta\rho_{2c}$ in transformation processor 59. The specific-force acceleration $a_{s2}$ is obtained from inertial measurement unit 29.

The input observable at input 43 is $(\rho_{2c}-\rho_{2m})$ where $\Delta\rho_{2c}$ is the estimated pseudorange vector of the first vehicle, and $\rho_{2m}$ is obtained from GPS receiver 27. The quantity $\rho_{2c}$ is obtained by (1) integrating the estimated velocity $\hat{V}_2$ over time in integrator 61 and incrementing the integrator output by $\Delta\hat{V}_2$ to obtain the estimated position $\hat{X}_2$ and (2) transforming the resulting $\hat{X}_2$ into the estimated pseudorange vector $\rho_{2c}$ in transformation processor 63.

The input observable at input 45 is $(\Delta\rho_{2c}-\Delta\rho_{1c})-(\Delta\rho_{2m}-\Delta\rho_{1m})$. The input observable at input 47 is $(\rho_{2c}-\rho_{1c})-(\rho_{2m}-\rho_{1m})$.

The relative velocity solution $\hat{V}_2-\hat{V}_1$ is provided at output 60, and the relative position solution $\hat{X}_2-\hat{X}_1$ is provided at output 62.

Figure 2:
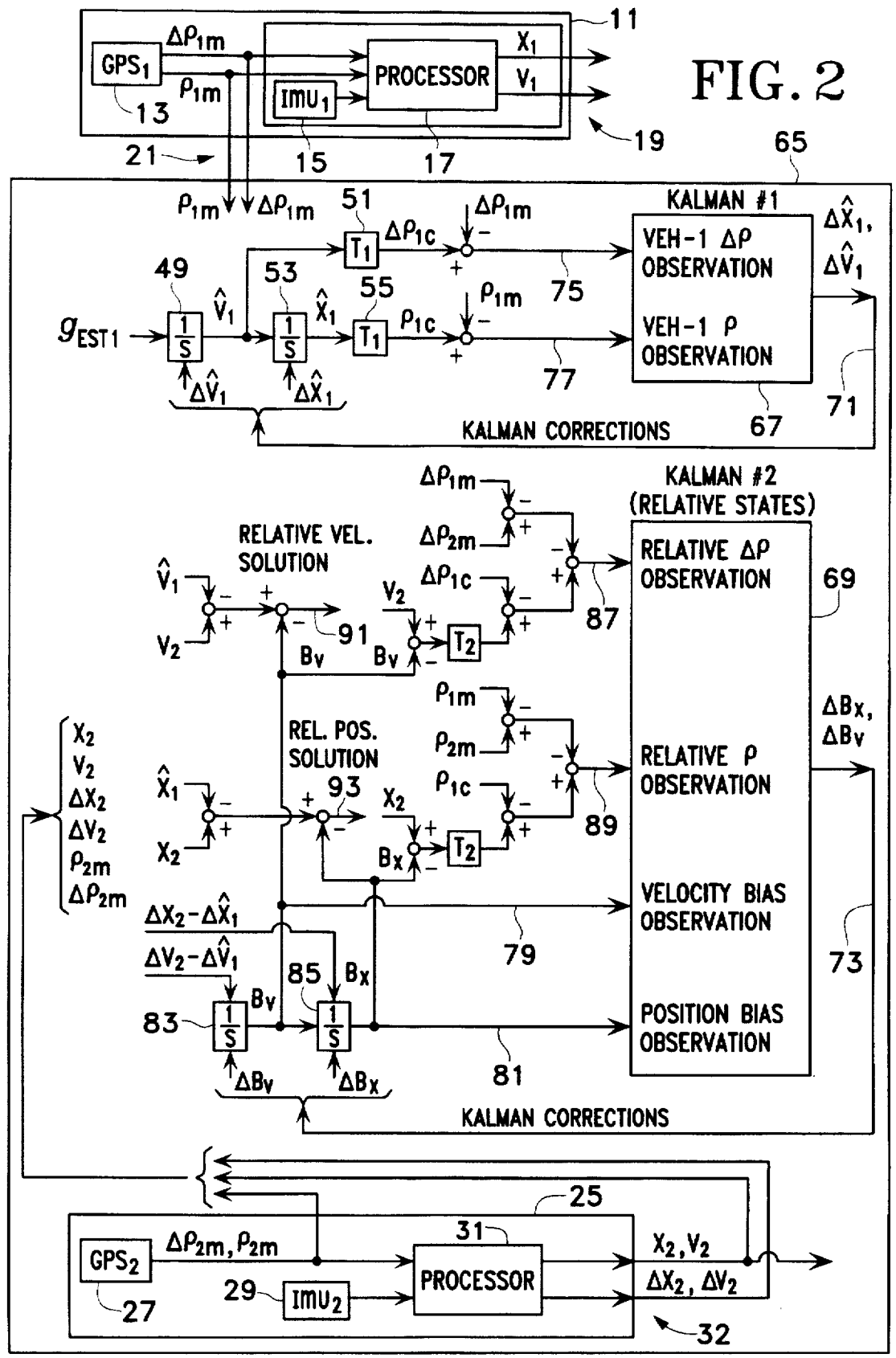
FIG. 2 is a block diagram of a second embodiment of the invention.

A block diagram of the second embodiment of the invention is shown in FIG. 2. The navigation system 11 of the first vehicle is the same as the one shown in FIG. 1.

The relative navigation system 65 of the second vehicle includes the absolute navigation system 25 (the same as the one shown in FIG. 1) and the processors 67 and 69 for performing respectively a first and a second Kalman filter process. It will be assumed for purposes of is discussion that a separate processor is associated with each Kalman filter process even though both Kalman filter processes could be performed by a single processor.

In this embodiment, the absolute navigation system 25, by performing a Kalman filter process in processor 31 for the purpose of blending the GPS and inertial measurement unit data, provides at 32 the autonomous velocity $V_2$, the autonomous position $X_2$, the autonomous velocity correction $\Delta V_2$, and the autonomous position correction $\Delta X_2$.

The outputs 71 of the first Kalman filter process are the estimated velocity and position corrections $\Delta\hat{V}_1$ and $\Delta\hat{X}_1$ for the first vehicle. The outputs 73 of the second Kalman filter process are the position and velocity bias corrections $\Delta B_X$ and $\Delta B_V$.

The input observable at input 75 is $(\Delta\rho_{1c}-\Delta\rho_{1m})$ where $\Delta\rho_{1c}$ is the estimated delta range vector of the first vehicle. If the first vehicle is subject only to a gravitational force, then the estimated delta range $\Delta\rho_{1c}$ vector of the first vehicle is obtained by (1) integrating an estimate of gravity $g_{est}$ at the first vehicle's location over time in integrator 49 and incrementing the integrator output by $\Delta\hat{V}_1$ to obtain the estimated velocity $\hat{V}_1$ and (2) transforming the resulting $\hat{V}_1$ into the estimated delta range vector $\Delta\rho_{1c}$ in transformation processor 51. If the first vehicle is also subject to a specific-force acceleration $a_{s1}$, then $\hat{V}_1$ is obtained by integrating $(a_{s1}+g_{est1})$ over time and incrementing the integrator output by $\Delta\hat{V}_1$.

The input observable at input 77 is $(\rho_{1c}-\rho_{1m})$ where $\rho_{1c}$ is the estimated pseudorange vector of the first vehicle. The quantity $\rho_{c1}$ is obtained by (1) integrating $\hat{V}_1$ over time in integrator 53 and then incrementing the integrator output by $\Delta\hat{X}_1$ to obtain the estimated position $\hat{X}_1$ and (2) transforming the resulting $\hat{X}_1$ into the estimated pseudorange vector $\rho_{1c}$ in transformation processor 55.

The input observable at input 79 is the velocity bias $B_V$ which is obtained by (1) incrementing the prior value of $B_V$ in integrator 83 by the difference $\Delta V_2-\Delta\hat{V}_1$ of the second vehicle's autonomous velocity correction and the first vehicle's estimated velocity correction and (2) incrementing the result by the velocity bias correction $\Delta B_V$.

The input observable at input 81 is the position bias $B_X$ which is obtained by (1) integrating $B_V$ over time in integrator 85 and incrementing the integrator output by the difference $\Delta X_2 - \Delta \widehat{X}_1$ of the second vehicle's autonomous position correction and the first vehicle's estimated position correction and (2) incrementing the result by the position bias correction $\Delta B_X$.

The input observable at input 87 is $(\Delta \rho_2 - \Delta \rho_{1c}) - (\Delta \rho_{2m} - \Delta \rho_{1m}) - \beta_V$. The input observable at input 89 is $(\rho_2 - \rho_{1c}) - (\rho_{2m} - \rho_{1m}) - \beta_X$. The quantities $V_2$, $X_2$, $B_V$, and $B_X$ transformed into the $\rho$ coordinate system are denoted by the symbols $\Delta \rho_2$, $\rho_2$, $\beta_V$, and $\beta_X$ respectively.

The relative velocity solution $V_2 - \widehat{V}_1 - \beta_V$ is provided at output 91, and the relative position solution $X_2 - \widehat{X}_1 - B_X$ is provided at output 93.

The embodiments of FIGS. 1 and 2 are structured to utilize pseudorange vectors and delta range vectors as inputs to the Kalman filter processes. The elimination of the transformation processors results in embodiments whereby velocities and positions become the inputs to the Kalman filter processes.

A comparison of the FIG. 1 and FIG. 2 embodiments reveals the following. In both embodiments the existing navigation solution and Kalman filter process for both vehicles remains undisturbed so both retain their autonomous solutions. In both embodiments, one or two additional Kalman filter processes are added to the relative navigation system of the second vehicle, and the first vehicle transmits either GPS absolute position and absolute velocity or pseudorange and delta range vectors associated with viewable satellites.

The difference in the two embodiments is that in the FIG. 1 embodiment the added Kalman filter process is a single filter containing states for both the first vehicle's absolute position and velocity and the second vehicle's absolute position and velocity, thus inherently encompassing all cross correlations between the two vehicles' positions and velocities.

In the FIG. 2 embodiment, the two smaller Kalman filter processes are added instead of only one. The first of the two added processes handles the first vehicle's absolute position and velocity. The second handles the relative position and velocity of the second vehicle to the first. Since the two Kalman filter processes are separate, their states are not correlated.

In both embodiments, the fundamental relative velocity accuracy is obtained by a difference in delta range observations using the same satellite transmitters. This observation is taken with low observation noise in the Kalman filter process and produces strong results. In addition, a difference in pseudorange observations using the same satellite transmitters is also used which tends to help relative velocity as well.

In both embodiments, the first and second vehicles are allowed to take autonomous absolute delta range and/or pseudorange GPS updates without any regard to the same satellite transmitters. This approach has three advantages: (1) The existing systems' autonomous solutions are unaffected by the process of obtaining a relative solution; (2) The systems are not required to report common satellite transmitters for their autonomous solution thereby avoiding the problem of separated systems having to agree on a common set of satellite transmitters; and (3) Even if the two autonomous systems are forced to update using the same satellite transmitters, the two systems still may not have the same final errors because their filter gains may be different.

In the FIG. 1 embodiment, no relative position or velocity states appear. Yet the difference between the two systems' estimates will reflect the accuracy of the relative observations since the single Kalman filter process has all covariances, and relative observations are allowed only on common satellite transmitters.

In the FIG. 2 embodiment, two smaller Kalman filter processes are added. The second added Kalman directly estimates the apparent velocity and position bias between the autonomous solutions, such that GPS relative observations are satisfied. In addition to updates to the bias states from the second Kalman filter process, the bias states are also stepped whenever an autonomous Kalman correction is made.

The advantage of the FIG. 2 embodiment is less computation. The disadvantage is possibly poorer performance due to less accurate modeling.

What is claimed is:

1. A method for determining the relative position and velocity of a second vehicle with respect to a first vehicle, the method being practiced on board the second vehicle, the method utilizing a plurality of satellite transmitters and an inertial measurement unit on the second vehicle, the first vehicle having data items consisting of the first vehicle's measured position, measured velocity, and optionally specific-force acceleration, the measured position and measured velocity being determined utilizing the radio signals from a plurality of satellite transmitters, the specific-force acceleration being obtained from an optional inertial measurement unit, the measured position and measured velocity being expressed as ranges and range rates with respect to the plurality of satellite transmitters or as coordinates in some other predetermined coordinate system, the second vehicle having data items consisting of the second vehicle's measured position, measured velocity, specific-force acceleration, autonomous position, autonomous velocity, autonomous position correction, and autonomous velocity correction, the measured position and measured velocity being determined utilizing the radio signals from a plurality of satellite transmitters, the specific-force acceleration being obtained from an inertial measurement unit, the measured position and measured velocity being expressed as ranges and range rates with respect to the plurality of satellite transmitters or as coordinates in some other predetermined coordinate system, the autonomous position, autonomous velocity, autonomous position correction, and autonomous velocity correction being outputs of an autonomous Kalman filter process, the inputs to the autonomous Kalman process being derived from the second vehicle's measured position, measured velocity, and specific-force acceleration, the method comprising the steps:

(a) obtaining a plurality of the first vehicle's data items from the first vehicle;

(b) determining the estimated relative position and the estimated relative velocity of the second vehicle with respect to the first vehicle utilizing the plurality of data items obtained from the first vehicle and one or more of the second vehicle's data items including either the specific-force acceleration or the group of data items consisting of autonomous position, autonomous velocity, autonomous position correction, and autonomous velocity correction the estimated relative position and the estimated relative velocity of the second vehicle being respectively the difference between the estimated positions of the first and second vehicles and the difference between the estimated velocities of the first and second vehicles, the estimated position and the estimated velocity of the first vehicle being calculated from either (1) an estimate of gravity at the first vehicle's location an estimated position correction and an estimated velocity correction or (2) the sum of the specific-force acceleration of the first vehicle and an estimate of gravity at the first vehicle's location, an estimated position correction and an estimated velocity correction.

2. The method of claim 1 wherein step (b) includes a Kalman filter process, the input observables to the Kalman process being the difference of the estimated position and the measured position for the first vehicle and for the second vehicle, the difference of the estimated velocity and the measured velocity for the first vehicle and for the second vehicle, the difference of the estimated relative position and the measured relative position, and the difference of the estimated relative velocity and the measured relative velocity, the measured relative position being the difference of the measured positions of the second vehicle and the first vehicle, the measured relative velocity being the difference of the measured velocities of the second vehicle and the first vehicle, the outputs of the Kalman process being estimated position corrections and estimated velocity corrections for the first and second vehicles.

3. The method of claim 2 wherein step (b) comprises the step:

integrating an estimate of gravity and incrementing the result by the estimated velocity correction for the first vehicle to obtain the estimated velocity of the first vehicle.

4. The method of claim 2 wherein step (b) comprises the step:

integrating the sum of the specific-force acceleration of the first vehicle and an estimate of gravity and incrementing the result by the estimated velocity correction for the first vehicle to obtain the estimated velocity of the first vehicle.

5. The method of claim 2 wherein step (b) comprises the step:

integrating the estimated velocity of the first vehicle and incrementing the result by the estimated position correction for the first vehicle to obtain the estimated position of the first vehicle.

6. The method of claim 2 wherein step (b) comprises the step:

integrating the sum of the specific-force acceleration of the second vehicle and an estimate of gravity and incrementing the result by the estimated velocity correction for the second vehicle to obtain the estimated velocity of the second vehicle.

7. The method of claim 2 wherein step (d) comprises the step:

integrating the estimated velocity of the second vehicle and incrementing the result by the estimated position correction for the second vehicle to obtain the estimated position of the second vehicle.

8. The method of claim 1 wherein step (b) includes a first and a second Kalman filter process, the input observables to the first Kalman process being the difference of the estimated position and the measured position for the first vehicle and the difference of the estimated velocity and the measured velocity for the first vehicle, the outputs of the first Kalman process being estimated position correction and estimated velocity correction for the first vehicle, the input observables to the second Kalman process being the difference of the estimated relative position and the measured relative position, the difference of the estimated relative velocity and the measured relative velocity, position bias, and velocity bias, the outputs of the second Kalman process being position bias correction and velocity bias correction.

9. The method of claim 8 wherein step (b) comprises the step:

integrating an estimate of gravity and incrementing the result by the estimated velocity correction for the first vehicle to obtain the estimated velocity of the first vehicle.

10. The method of claim 8 wherein step (b) comprises the step:

integrating the sum of the specific-force acceleration of the first vehicle and an estimate of gravity and incrementing the result by the estimated velocity correction for the first vehicle to obtain the estimated velocity of the first vehicle.

11. The method of claim 8 wherein step (b) comprises the step:

integrating the estimated velocity of the first vehicle and incrementing the result by the estimated position correction for the first vehicle to obtain the estimated position of the first vehicle.

12. The method of claim 8 wherein step (b) comprises the step:

incrementing the prior value of the velocity bias by (1) the difference of the autonomous velocity correction and the estimated velocity correction for the first vehicle and (2) the velocity bias correction to obtain the new value for the velocity bias.

13. The method of claim 8 wherein step (b) comprises the step:

integrating the velocity bias and incrementing the result by (1) the difference of the autonomous position correction and the estimated position correction for the first vehicle and (2) the position bias correction to obtain the new value for the position bias.

14. The method of claim 8 wherein step (b) comprises the step:

obtaining the estimated relative velocity by taking the difference of the autonomous velocity of the second vehicle and the estimated velocity of the first vehicle and then subtracting the velocity bias.

15. The method of claim 8 wherein step (b) comprises the step:

obtaining the estimated relative position by taking the difference of the autonomous position of the second vehicle and the estimated position of the first vehicle and then subtracting the position bias.

* * * * *